(12) United States Patent
Kim

(10) Patent No.: US 9,625,058 B2
(45) Date of Patent: Apr. 18, 2017

(54) GRIP-TYPE LOCKING DEVICE FOR TERMINAL

(71) Applicant: Kum Oh Electronics CO., LTD., Bucheon-si (KR)

(72) Inventor: Ki Sang Kim, Siheung-si (KR)

(73) Assignee: KUM OH ELECTRONICS CO., LTD., Bucheon-si (KR)

(*) Notice: Subject to any disclaimer, the term of this patent is extended or adjusted under 35 U.S.C. 154(b) by 743 days.

(21) Appl. No.: 13/894,572

(22) Filed: May 15, 2013

(65) Prior Publication Data
US 2014/0263873 A1     Sep. 18, 2014

(30) Foreign Application Priority Data
Mar. 18, 2013 (KR) .................. 10-2013-0028652

(51) Int. Cl.
| | | |
|---|---|---|
| B65D 45/00 | (2006.01) | |
| F16L 3/10 | (2006.01) | |
| E05B 73/00 | (2006.01) | |
| G08B 13/14 | (2006.01) | |
| A47F 7/024 | (2006.01) | |

(52) U.S. Cl.
CPC ........ *F16L 3/1033* (2013.01); *E05B 73/0082* (2013.01); *G08B 13/1463* (2013.01); *A47F 7/024* (2013.01)

(58) Field of Classification Search
CPC ............... Y10T 292/214; Y10T 292/20; Y10T 24/1441; Y10T 24/2179; Y10T 292/505; E05B 65/00; E05C 19/186; F16L 33/04; G08B 13/2434; G09F 3/14
USPC ..... 292/256, 256.65, 256.67, 256.72, 256.75
See application file for complete search history.

(56) References Cited

U.S. PATENT DOCUMENTS

| | | | | |
|---|---|---|---|---|
| 2,688,170 | A * | 9/1954 | Balzer ..................... | F16L 23/10 24/279 |
| 5,620,215 | A * | 4/1997 | Janeway ............. | E05B 65/0888 292/256 |
| 6,443,507 | B1 * | 9/2002 | Korvemaker ........ | B65D 45/345 292/256.6 |
| 6,581,884 | B1 * | 6/2003 | Gretz ...................... | F16L 3/133 24/278 |
| 2009/0173863 | A1 * | 7/2009 | Crown ................ | B60R 11/0241 248/316.4 |

FOREIGN PATENT DOCUMENTS

| | | |
|---|---|---|
| KR | 100820472 | 4/2008 |
| KR | 1020100095267 | 8/2010 |
| KR | 1020130010522 | 1/2013 |

\* cited by examiner

*Primary Examiner* — Mark Williams
(74) *Attorney, Agent, or Firm* — Cantor Colburn LLP

(57) ABSTRACT

Disclosed herein is a grip-type locking device for a terminal. The locking device includes a body. Two grips are connected to opposite sides of the body, respectively. An interval adjusting pin adjusts an interval between the two grips, thus locking or releasing the terminal interposed therebetween. A cable is connected at opposite ends thereof to a controller and the terminal, respectively. The cable is securely coupled to the body so that load applied to the cable on the controller is blocked by the body and thus is not transmitted to the cable on the terminal.

3 Claims, 4 Drawing Sheets

GRIP-TYPE LOCKING DEVICE FOR TERMINAL

BACKGROUND OF THE INVENTION

1. Field of the Invention

The present invention relates to a locking device for a terminal, capable of preventing an unauthorized person from using the terminal without permission or stealing the terminal and, more particularly, to a grip-type locking device for a terminal, which is intended to physically and electrically lock the terminal, thus limiting arbitrary use by an unauthorized person and preventing the terminal from being stolen, and which is simple in a locking configuration, thus being inexpensive, and is also simple in a locking method, thus being convenient to use, and which is configured so that, when load caused by an external force is applied, the load is not transmitted to a first connector connected to the terminal, thus preventing the first connector and a communication port of the terminal connected to the first connector from being damaged.

2. Description of the Related Art

Generally, with the rapid development of electronic communication technology, a variety of terminals having various convenient functions, such as mobile phones, notebook computers, tablets, navigation systems, or PDAs, have been developed and brought to market.

In recent years, these terminals have become daily essentials. As the terminals become more advanced, they are improved in convenient functions and miniaturized, and thus the cost of such products increases.

As such, as the terminals are more advanced, miniaturized, and expensive, cases in which the terminals are used by unauthorized persons are on the increase, as is the number of burglaries in which the terminals are targeted by burglars.

Therefore, technologies for locking the terminal are proposed to limit the unauthorized use of the terminal by an unauthorized person and to prevent the terminal from being stolen.

As prior art for limiting the unauthorized use of the terminal by an unauthorized person and for preventing the terminal from being stolen, there has been proposed Korean Patent Laid-Open Publication No. 2010-0095267, which is entitled "Antitheft device and method through setting authorized area" (referred to cited document 1).

According to the cited document 1, an authorized area is set through a program installed in a terminal, and it is determined whether the terminal is out of the authorized area through a GPS mounted on the terminal. If the terminal is out of the authorized area, the authentication of use is requested. If a user is not a registered user, the terminal is automatically set to a locking mode to restrict the use of the terminal. Further, location information related to the terminal is sent to a user and location tracking is implemented to allow him or her to find the terminal.

As another prior art, there has been proposed Korean Patent Laid-Open Publication No. 2013-0010522, which is entitled "Authentication method for preventing smart phone from being lost and stolen" (referred to cited document 2).

According to the cited document 2, a client (application) installed in the smart phone exchanges authentication information with an authentication server during network connection to execute authentication. If authentication information informing of the loss of the smart phone is received from the authentication server, the smart phone is converted into a locking mode. In this manner, this method is intended to prevent the smart phone from being lost and stolen.

As a further prior art, there has been proposed Korean Patent No. 0820472, which is entitled "Burglary protecting apparatus for telematics terminal in vehicle" (referred to cited document 3).

According to the cited document 3, the terminal is installed in a housing mounted on the vehicle in such a way that the separation of the terminal is impossible. If the housing equipped with the terminal is separated from the vehicle, an alarm is activated, thus preventing the terminal from being stolen.

However, the above-mentioned two Laid-Open Publications are intended to restrict the use of the terminal by an unauthorized person and to enable an owner to find his or her terminal, after the terminal is stolen. Thus, they are relatively inefficient. That is, after the terminal is stolen, a thief can release the locking technology that is applied to restrict the use or to help in finding a stolen article, without great difficulty, even if it takes a relatively long time to release the locking technology.

The above-mentioned patent is problematic in that it is limited to only the terminal securely mounted on the vehicle. In contrast, most of terminals that are to be protected against the unauthorized use by an unauthorized person or theft are portable terminals, for example, a smart phone (mobile phone), a tablet, a notebook computer, etc.

DOCUMENTS OF RELATED ART (Cited Document 1) Korean Patent Laid-Open Publication No. 2010-0095267;

(Cited Document 2) Korean Patent Laid-Open Publication No. 2013-0010522; and (Cited Document 3) Korean Patent No. 0820472.

SUMMARY OF THE INVENTION

Accordingly, the present invention has been made keeping in mind the above problems occurring in the related art, wherein the conventional locking device for the terminal is intended to limit the unauthorized use of the terminal by an unauthorized person or to limit the location of the terminal, after the terminal is stolen (lost) and taken out of a user's control range, so the locking device is relatively inefficient.

An object of the present invention is to provide a grip-type locking device for a terminal, which limits the unauthorized use of the terminal by an unauthorized person or powerfully prevents the terminal from being stolen when the terminal is within a control range of a user (including an owner, a manager, a seller, and so forth).

Another object of the present invention is to provide a grip-type locking device for a terminal, which physically and electrically locks the terminal, thus limiting the unauthorized use of the terminal by an unauthorized person and preventing the terminal from being stolen.

A further object of the present invention is to provide a grip-type locking device for a terminal, which is simple in configuration, inexpensive, and convenient in locking method, thus being convenient to use.

Yet another object of the present invention is to provide a grip-type locking device for a terminal, in which, when load caused by an external force is applied to the cable, the load is not transmitted to a first connector provided on an end of the cable and connected to the terminal, thus preventing the first connector and a communication port of the terminal connected to the first connector from being damaged.

In order to accomplish the above objects, the present invention provides a grip-type locking device for a terminal, including a body; two grips connected to opposite sides of the body, respectively; an interval adjusting pin adjusting an interval between the two grips, thus locking or releasing the terminal interposed therebetween; and a cable connected at opposite ends thereof to a controller and the terminal, respectively, wherein the cable is securely coupled to the body so that load applied to the cable on the controller is blocked by the body and thus is not transmitted to the cable on the terminal.

Further, the cable may be an integrated type without having an intermediate connecting portion, and may pass through the body to be securely coupled thereto.

The grip-type locking device may further include a fixing block securely coupled to the body; a coupling block provided on an end of the cable and securely coupled to a connector holding body, the connector holding body being provided with a first connector that is connected to the terminal; and an injection-molded part coupled to the cable by injection molding.

A concave groove may be formed on a central portion of the interval adjusting pin, and the body may be provided with a locking pin, the locking pin being inserted into the body in such a way that an end thereof is disposed on and caught by the concave groove.

As is apparent from the above description, the grip-type locking device for the terminal according to the present invention is advantageous in that it prevents the terminal from being used without permission by an unauthorized person or from being stolen while the terminal is within a user's control range, so that it is far more efficient than the related art wherein the use of the terminal is limited or the location of the terminal is tracked after the terminal is stolen.

Further, the grip-type locking device for the terminal is advantageous in that it locks the terminal physically and electrically, thus very efficiently preventing the terminal from being used without permission by an unauthorized person and from being stolen.

Furthermore, the grip-type locking device for the terminal is advantageous in that it is simple in configuration, inexpensive, and simple in locking method, thus being convenient to use.

Further, the grip-type locking device for the terminal is advantageous in that, when load caused by an external force is applied to the cable, the load is not transmitted to a first connector, thus preventing the first connector and a communication port of the terminal from being damaged.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

Figure 1:
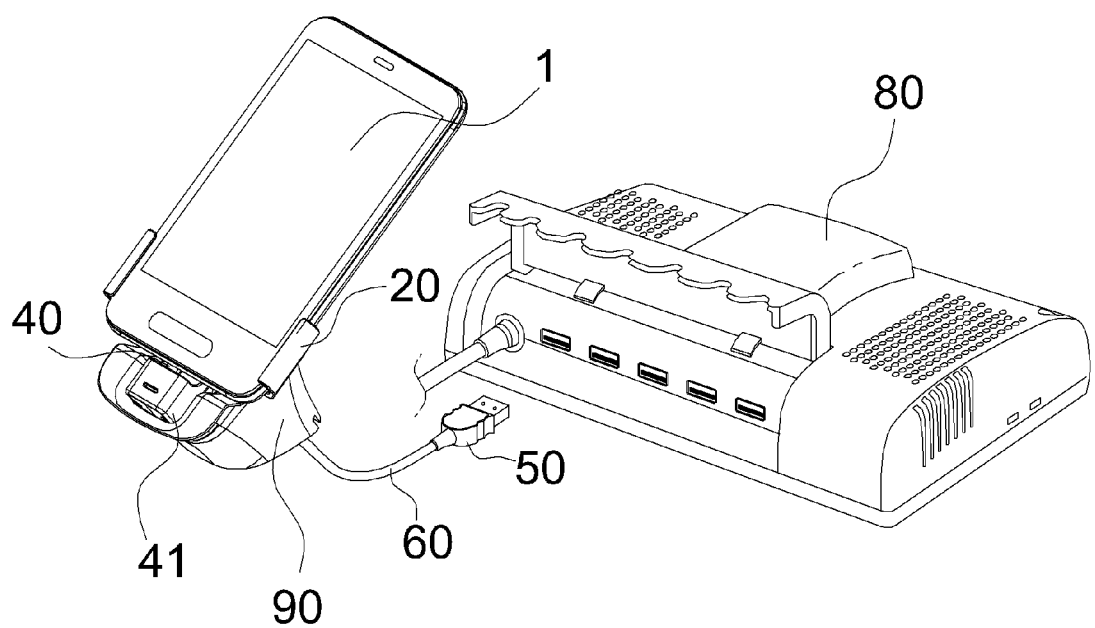
FIG. 1 is a perspective view showing an example of a terminal locked by a locking device according to the present invention.

Hereinafter, a grip-type locking device for a terminal according to the present invention will be described more specifically with reference to the accompanying drawings.

Before the present invention is described in detail, it should be noted that various changes may be made to the present invention, so aspects (or embodiments) of the present invention will be described in detail, merely by way of example. However, it should be understood that the present invention is not limited to a specific embodiment, but embraces all changes, equivalents, and substitutes within the technical idea and scope of the present invention.

The same reference numerals throughout the drawings, that is, the same reference numerals in a second digit and a first digit, or in a second digit, a first digit, and an alphabet character denote elements having the same or similar function. If there is no special mention, the elements denoted by the reference numerals are to be comprehended as the elements complying with the above-mentioned reference scheme.

For clarity and convenience of description, the size or thickness of components shown in the drawings may not be illustrated to scale.

Terms employed herein are for the purpose of description of particular aspects (or embodiments), and are not intended to limit the present invention. Further, the singular forms "a" and "an" include plural referents unless the context clearly dictates otherwise. In this description, it should be understood that terms such as "include" or "consist of" are inclusive of characteristics, numerals, steps, operations, components, parts or combination thereof, but are not exclusive of one or more different characteristics, numerals, steps, operations, components, parts or combination thereof.

Unless the context clearly defines otherwise, all terms or words used herein have the same meaning as common meaning understood by those skilled in the art. Terms defined in a dictionary are to be interpreted as having the same meaning as meaning used in the related art, and should not be interpreted ideally or excessively unless this application clearly defines otherwise.

As shown in the drawings, the grip-type locking device for the terminal according to the present invention mainly includes a body 10, grips 20, an interval adjusting pin 30, a first connector 40, a second connector 50, a cable 60, an injection-molded part 70, and a controller 80. The locking device may further include a holder 90.

Figure 2A:
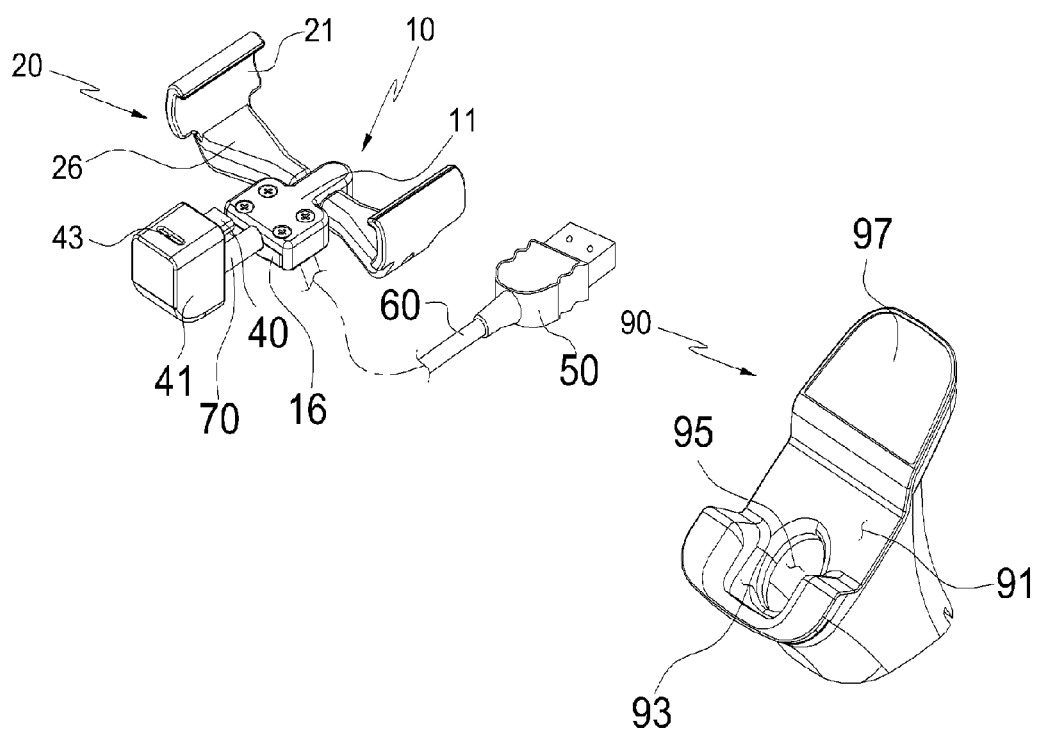
FIGS. 2A and 2B are perspective views showing the locking device according to the present invention.
Figure 2B:
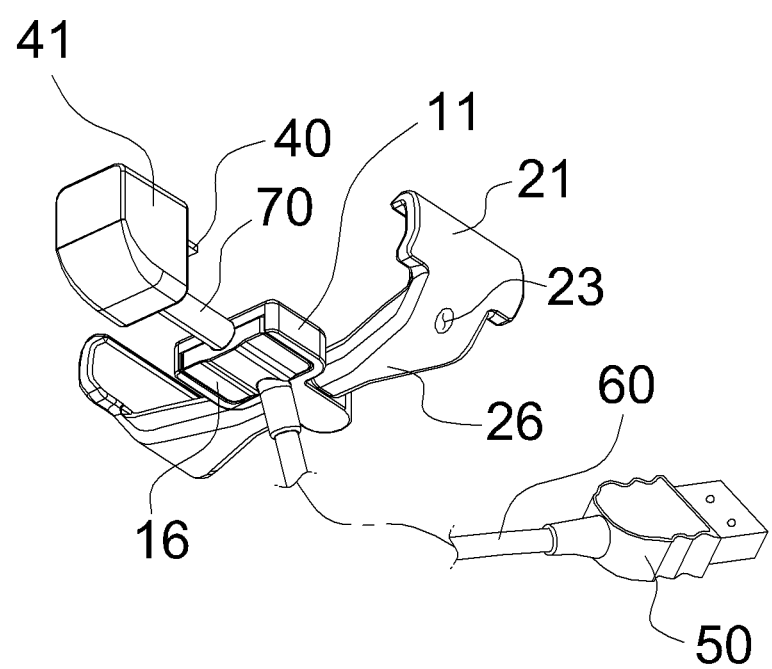
Figure 3:
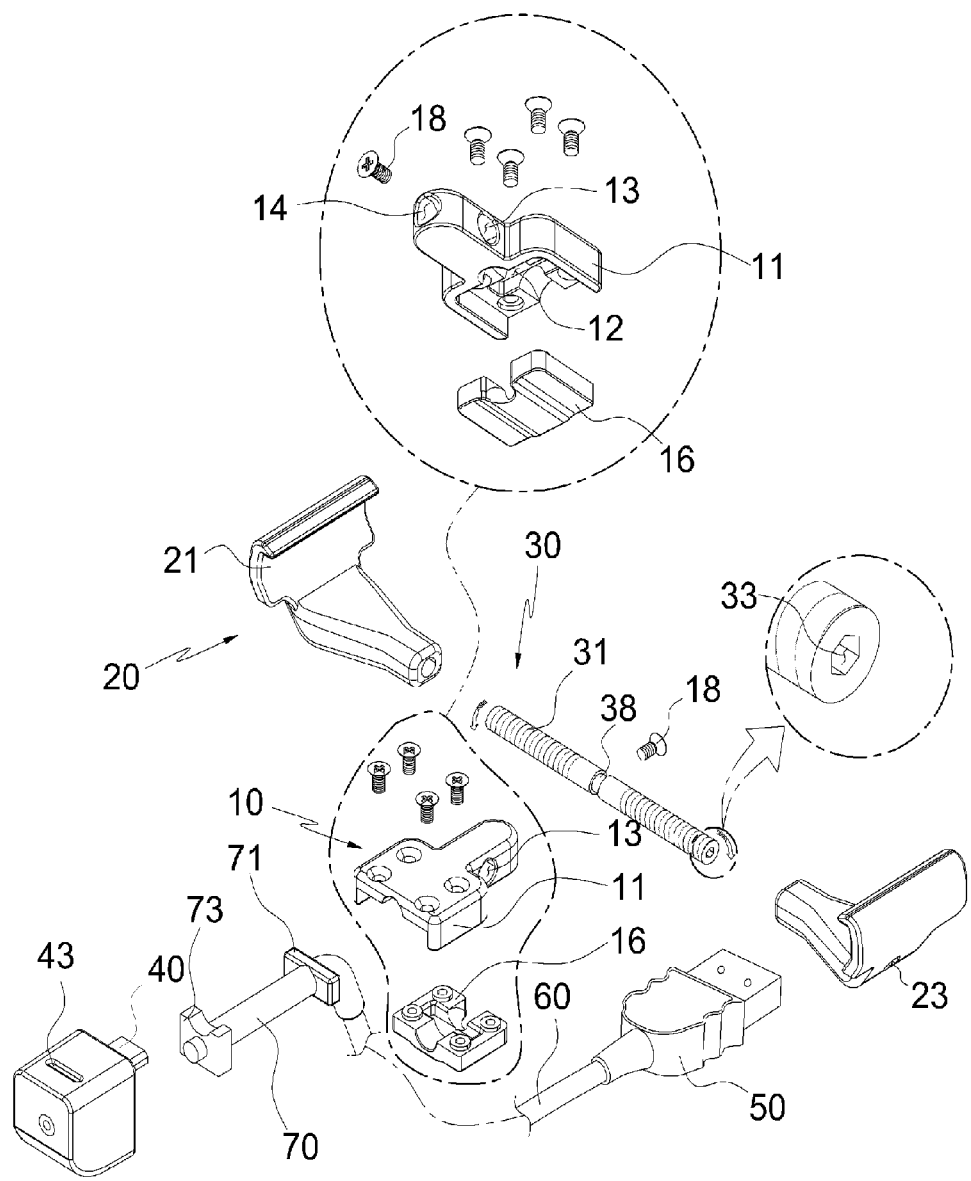
FIG. 3 is an exploded perspective view of FIGS. 2A and 2B.

Referring to FIGS. 1, 2A and 2B, a direction in which the terminal 1 is located is designated as an upper portion, while an opposite direction thereof is designated as a lower portion. Further, a direction in which the first connector 40 is designated as a front part, while an opposite direction thereof is designated as a rear part.

In the drawing, a smart phone is shown as an example of the terminal 1. However, in addition to the smart phone, the grip-type locking device for the terminal according to the present invention may be also used for the terminal 1 such as a notebook computer, a tablet, a PDA, or a navigation system.

The body 10 includes a main body part 11, and an assembly part 16 that is fastened to a lower portion of the main body part 11 via a bolt to be assembled therewith.

A receiving part 12 is provided on a lower portion of a front portion of the main body part 11 to receive the assembly part 16 therein. Through holes 13 are formed, respectively, in left and right side surfaces of a rear portion of the main body part 11 to allow the interval adjusting pin 30 to pass therethrough. A communication hole 14 is formed in a rear surface of the main body part 11 in such a way as to be open towards the front portion and thus communicate with the through holes 13.

The main body part 11 and the assembly part 16 are assembled with each other to accommodate a side of the injection-molded part 70 provided on the cable 60. A fixing block 71 is provided on a rear portion of the injection-molded part 70. The fixing block 71 is caught by an interior of the main body part 11 to prevent its removal from the main body part 11.

A locking pin 18 is inserted into the communication hole 14 in such a way that an end of the locking pin 18 is disposed on a concave groove 38 formed on a central portion of the interval adjusting pin 30, the interval adjusting pin 30 passing through the through holes 13. Since the locking pin 18 is disposed on and caught by the concave groove 38 of the interval adjusting pin 30, the interval adjusting pin 30 is not removed from the main body part 11, and the main body part is positioned at the central portion of the interval adjusting pin 30.

The grips 20 are connected to opposite sides of the body 10, respectively, and an interval between the two grips 20 is adjusted by the interval adjusting pin 30, thus tightening and locking the terminal 1 or releasing the terminal 1.

Each grip 20 includes a grip part 21 to surround and grip a side surface of the terminal 1, and a support part 26 that is connected to an inner end of the grip part 21 to support a rear surface of the terminal 1 in a contact manner.

A through hole 23 is formed through the support part 26 in a direction from left to right thereof, so that the interval adjusting pin 30 passes through the through hole 23.

A thread is formed on an inner surface of the through hole 23 to be screwed to the interval adjusting pin 30.

The interval adjusting pin 30 passes through the body 10 and the two opposite grips 20. As the interval adjusting pin 30 screwed to the grips 20 rotates in a forward or reverse direction, the interval between the two grips 20 is reduced or increased to tighten and lock the terminal 1 between the two grips 20 or to release the terminal 1 from the grips 20.

The interval adjusting pin 30 may be screwed to either of the two opposite grips 20 to move the screwed grip 20 towards or away from the other grip 20. However, in this respect, the amount by which the grip 20 is moved is less in comparison with the rotating amount of the interval adjusting pin 30. Thus, it is inefficient to tighten or loosen the grip 20.

Therefore, preferably, the interval adjusting pin 30 is screwed to the two opposite grips 20 to allow the two grips 20 to simultaneously move inwards or outwards, thus increasing the tightening or loosening efficiency.

To this end, screw taps 31 are formed on the outer surfaces of the opposite sides of the interval adjusting pin 30 to be screwed to the two grips 20, respectively. Both the screw taps 31 are formed in opposite directions. Thereby, as the interval adjusting pin 30 rotates in the forward or reverse direction, the two grips 20 move inwards or outwards to reduce or increase the interval therebetween.

A tool fitting hole 33 is formed in one end or opposite ends of the interval adjusting pin 30, so that a tool for rotating the interval adjusting pin 30, for example, a wrench or a screw driver, is fitted into the tool fitting hole 33.

Further, the concave groove 38 is formed on the central portion of the interval adjusting pin 30. The end of the locking pin 18 provided on the body 10 is disposed on and caught by the concave groove 38, thus allowing the body 10 to be positioned on the central portion of the interval adjusting pin 30 without being biased to one side.

The first connector 40 is connected to a communication port of the terminal 1, the second connector 50 is connected to the controller 80, and the cable 60 electrically connects the first connector 40 with the second connector 50.

The first connector 40 is provided on a connector holding body 41, and the connector holding body 41 is caught by a coupling block 73 formed on the front portion of the injection-molded part 70 that is provided on the cable 60. On the connector holding body 41 is provided a display lamp 43 that emits light to display whether the first connector 40 is connected to the communication port of the terminal 1 and the second connector 50 is connected to the controller 80.

The first connector 40 is connected to the communication port of the terminal 1 to prevent another connector from being connected, thus preventing an unauthorized person from carrying out an arbitrary connection to the terminal 1 via the communication port and accessing data stored in the terminal 1. Access to the data stored in the terminal 1, without using the communication port, can be blocked by an authentication means such as a password that is specified in the terminal 1.

The first connector 40 varies in specification depending on the kind and manufacturer of the terminal 1. That is, the specification of the communication port of the terminal 1, including a size, shape, or dimension, is not standardized yet, so that the terminal 1 varies in specification depending on its manufacturer.

Therefore, the first connector 40 must have a specification fit for the kind and manufacturer of the terminal that is to be locked, so that the first connector 40 needs to be replaceable. That is, in or after a manufacturing process, among several specifications of first connectors 40, it is necessary to mount a selected specification of first connector 40.

In other words, if the body 10 and the connector holding body 41 equipped with the first connector 40 are integrated into or are integrally coupled to each other, the body 10 and the connector holding body 41 should be inconveniently disassembled from each other when it is desired to replace the mounted first connector with another first connector. Thus, in order to overcome such a problem, according to the present invention, the body 10 and the connector holding body 41 are separately manufactured, and then are respectively assembled with the cable 60 (more specifically, the injection-molded part 70 provided on the cable 60). Thereby, when it is necessary to use another specification of first connector, only the connector holding body 41 having this specification of first connector needs to be selected and mounted to the cable 60, without a need to replace the body 10 with another one.

The cable 60 has on opposite ends thereof the first connector 40 and the second connector 50, respectively. The first connector 40 is connected to the terminal 1 and the second connector 50 is connected to the controller 80, thus making the terminal 1 and the controller 80 communicate with each other via the cable. Here, the communication means the transmitting and receiving operation of data and the power supply for charging the terminal, etc. The communication also means that the controller 80 recognizes that the terminal 1 and the controller 80 are electrically disconnected from each other due to a theft attempt by an unauthorized person and thereby there occurs loss of communication (i.e. a theft detecting signal).

The cable 60 may be separated into two cables. That is, a first cable having the first connector 40 and a second cable having the second connector 50 may be separately manufactured, and then the first cable and the second cable may be connected to each other. In other words, a female connecting terminal and a male connecting terminal may be provided, respectively, on an end of the first cable and an end of the second cable, and then the female connecting terminal and the male connecting terminal may be connected to each other in the body 10. In practice, when the cable having connectors (i.e. first connector and second connector) on opposite sides thereof passes through an intermediate medium (i.e. body), frequently, the cable is separated into two cables and the two separated cables are connected to each other in the intermediate medium. However, such a configuration wherein the cable is separated into the two cables and the two cables are connected to each other via the connecting terminals at the intermediate position (i.e. at the intermediate medium) is problematic in that it is complicated to perform a connecting operation and the connection is unstable.

Therefore, according to the present invention, the integrated type cable is used, instead of the separate type cable, so that the cable simply passes through the body. That is, the cable of the present invention has no intermediate connecting portion.

When an external force caused by a theft attempt by an unauthorized person or an external force caused by the mishandling of the terminal or locking device is applied, load resulting from the external force frequently concentrates on the cable. That is, if the external force is applied, the cable 60 is frequently pulled.

If the cable 60 is pulled, the first connector 40 and the second connector 50 provided on the cable 60 tend to be separated from the terminal 1 and the controller 80. In this respect, in terms of the structure of the locking device according to the present invention, the first connector 40 is configured so that it is not easily separable from the communication port of the terminal 1. Thus, if the cable 60 is pulled out, load is applied to the first connector 40, so that the first connector 40 may be damaged or the communication port of the terminal 1 may be damaged.

Therefore, according to the present invention, when the load is applied to the cable 60, namely, the cable 60 is subjected to a pulling force, the cable 60 is securely coupled to the body 10 so that the load is not transmitted to the first connector 40. That is, the body 10 is securely coupled to the cable 60, so that the load transmitted from the body 10 to the cable on the controller 80 is blocked not to be transmitted from the body 10 the cable on the terminal 1.

The injection-molded part 70 is integrally provided on the cable 60 by injection molding so that the load applied to the cable 60 is blocked at the body 10 and is not transmitted to the first connector 40. The fixing block 71 is formed on the injection-molded part 70 to be caught by and fixed to the body 10.

The injection-molded part 70 is also interposed between the body 10 and the connector holding body 41, and the coupling block 73 is provided to be opposite to the fixing block 71 and is securely coupled to the connector holding body 41.

The controller 80 is electrically connected to the terminal 1 via the second connector 50, the cable 60 and the first connector 40, so that the controller 80 can perform data communication with the terminal 1 and charge the terminal 1.

Further, the controller 80 activates an alarm when an unauthorized person attempts to steal the terminal 1, thus warning the unauthorized person and informing a user of the theft attempt.

For example, when the tightening force of the grips 20 is weak, so an unauthorized person separates the terminal 1 from the grips 20, that is, when the first connector 40 is disconnected from the communication port of the terminal 1, or when the cable 60 is cut (broken) in order to steal the terminal 1 together with the grips 20, or when the second connector 50 is separated from the controller 80, the controller 80 determines such a situation as a theft attempt, thus activating an alarm.

The holder 90 holds the terminal 1 locked by the locking device. The holder 90 may be used when watching a video through the terminal 1 or displaying the terminal 1 in a booth or store.

On an upper surface of the holder 90 are provided a seat 91, a seating recess 93, a passing hole 95, and a support surface 97. The body 10 and the grips 20 are seated on the seat 91. The connector holding body 41 is seated on and caught by the seating recess 93. The passing hole 95 is formed through a lower portion to allow the cable 60 to pass therethrough. The support surface 97 comes into contact with a rear surface of the rear portion of the terminal 1 to support it.

A process of locking the terminal in the locking device according to the present invention configured as described above will be described in brief in the following.

First, in the state where the interval between the two grips 20 is widened, the terminal is pushed into the front portion, so that the first connector 40 is connected to the communication port of the terminal 1.

Next, the interval adjusting pin 30 is rotated using the tool such as the screw driver or the wrench to reduce the interval between the two grips 20, thus allowing the grips 20 to tighten and lock the terminal.

Thereafter, the second connector 50 is connected to the controller 80. In this way, the locking process is completed.

A process of releasing the terminal from the locking device is performed in reverse order.

As described above, the present invention provides a grip-type locking device for a terminal, in which a grip tightens and locks the terminal to prevent the terminal from being removed from the grip, a first connector is connected to a communication port of the terminal to prevent another connector from being connected to the communication port, thus preventing an unauthorized person from using the terminal without permission, that is, physically locking the terminal, and in which a controller activates an alarm when a first connector is separated from the communication port of the terminal, or a second connector is separated from the controller, or the cable is cut, and specifically, when an unauthorized person attempts to steal the terminal, thus preventing the terminal from being stolen, that is, electrically locking the terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A grip-type locking device for a terminal, the locking device comprising:
    a body;
    two grips connected to opposite sides of the body, respectively, the two grips providing a space in-between and being capable of griping a terminal in the space;
    an interval adjusting pin penetrating the body and the two grips, an interval between the two grips being adjusted by rotation of the interval adjusting pin, thus being able to lock or release the terminal interposed between the two grips; and a cable, one end of which is capable of being connected to the terminal and the other end of which is capable of being connected to an external controller; and an injection-molded part securely coupled to the body by being caught inside the body, the injection-molded part being integrally formed with one end portion of the cable such that the injection-molded part joins the cable to the body, wherein a concave groove is formed on a central portion of the interval adjusting pin, and a locking pin is inserted through a communication hole formed in the body and into the concave groove.

2. The grip-type locking device as set forth in claim 1, wherein the cable is an integrated type without having an intermediate connecting portion.

3. The grip-type locking device as set forth in claim 1, further comprising:

a fixing block securely coupled to the injection-molded part, the injection-molded part being fixed to the body by the fixing block;

a coupling block provided on an end of the injection-molded part, and securely coupled to a connector holding body, the connector holding body being provided with a first connector that is capable of being connected to the terminal.

\* \* \* \* \*